(12) United States Patent
Takagi

(10) Patent No.: US 12,717,409 B2
(45) Date of Patent: Aug. 25, 2026

(54) INFORMATION PROCESSING DEVICE, CONTROL METHOD OF INFORMATION PROCESSING DEVICE, AND NON-TRANSITORY COMPUTER READABLE MEDIUM

(71) Applicant: CANON KABUSHIKI KAISHA, Tokyo (JP)

(72) Inventor: Toshiyuki Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/907,236

(22) Filed: Oct. 4, 2024

(65) Prior Publication Data

US 2025/0117084 A1 Apr. 10, 2025

(30) Foreign Application Priority Data

Oct. 6, 2023 (JP) ................................ 2023-174232

(51) Int. Cl.

*G06F 3/01* (2006.01)
*G06F 3/0346* (2013.01)
*G06F 3/04815* (2022.01)

(52) U.S. Cl.

CPC .............. *G06F 3/014* (2013.01); *G06F 3/011* (2013.01); *G06F 3/016* (2013.01); *G06F 3/017* (2013.01); *G06F 3/0346* (2013.01); *G06F 3/04815* (2013.01); *G06F 2203/0331* (2013.01)

(58) Field of Classification Search

CPC .......... G06F 3/002; G06F 3/005; G06F 3/011; G06F 3/014; G06F 3/016; G06F 3/017; G06F 3/033; G06F 3/0346; G06F 3/04815; G06F 2203/0331

USPC ........................................................ 345/156

See application file for complete search history.

(56) References Cited

U.S. PATENT DOCUMENTS

| | | | | |
|---|---|---|---|---|
| 10,055,018 | B2 * | 8/2018 | Tokubo | G06F 3/016 |
| 10,241,573 | B2 * | 3/2019 | Mallinson | A63F 13/235 |
| 11,949,673 | B1 * | 4/2024 | Sanchez | H04L 63/0853 |
| 12,314,473 | B2 * | 5/2025 | Yokoyama | G06F 3/017 |
| 2016/0054797 | A1 * | 2/2016 | Tokubo | G06F 3/0346 345/633 |
| 2017/0346635 | A1 * | 11/2017 | Gummeson | G06F 1/16 |
| 2018/0095542 | A1 | 4/2018 | Mallinson | |

(Continued)

FOREIGN PATENT DOCUMENTS

| | | |
|---|---|---|
| JP | 2015152973 A | 8/2015 |
| JP | 2018110330 A | 7/2018 |
| JP | 2021008794 A | 1/2021 |

*Primary Examiner* — Jason M Mandeville
(74) *Attorney, Agent, or Firm* — Canon U.S.A., Inc. IP Division

(57) ABSTRACT

An information processing device according to the present invention is an information processing device configured to receive an operation by a user on an operation interface, includes: one or more processors and/or circuitry configured to perform acquisition processing in which first information related to contact between a real object and a hand of the user is acquired, the real object being different from the operation interface and the information processing device; and perform control processing in which it is disabled a function associated with the operation interface in a case where the first information acquired in the acquisition processing indicates that the hand is in contact with the real object.

15 Claims, 10 Drawing Sheets

(56) References Cited

U.S. PATENT DOCUMENTS

| | | | | |
|---|---|---|---|---|
| 2022/0413640 | A1 * | 12/2022 | Kawamae | G06F 3/017 |
| 2023/0244313 | A1 | 8/2023 | Ishikawa | |
| 2023/0244316 | A1 * | 8/2023 | Schwarz | G06N 3/08<br>345/156 |
| 2024/0184368 | A1 * | 6/2024 | Yokoyama | G06F 3/011 |

* cited by examiner

DISABLING PROCESSING START
S501
ACQUIRE REAL IMAGE
S502
HAND CONTACTING REAL OBJECT?
NO
YES
S503
ACQUIRE DISABLING IMAGE
S504
REAL IMAGE MATCHING REAL OBJECT REFLECTED IN DISABLING IMAGE?
NO
YES
S505
DISABLE FUNCTIONS OF CONTROLLER
END

ENABLING PROCESSING START
S601
ACQUIRE REAL IMAGE
S602
HAND REFLECTED IN REAL IMAGE?
YES
NO
S604
HAND CONTACTING REAL OBJECT?
YES
NO
S603
ENABLE FUNCTIONS OF CONTROLLER
END

INFORMATION PROCESSING DEVICE, CONTROL METHOD OF INFORMATION PROCESSING DEVICE, AND NON-TRANSITORY COMPUTER READABLE MEDIUM

BACKGROUND OF THE INVENTION

Field of the Invention

The present invention relates to an information processing device, a control method of an information processing device, and a non-transitory computer readable medium.

Description of the Related Art

In cross-reality (XR) systems that enable users to experience virtual realities, head-mounted displays (HMDs) are often used. Further, controllers may be used to convert the motions of users' hands into motions in virtual space (virtual reality space). The HMDs represent glasses-shaped devices including small displays worn on users' heads.

Japanese Patent Application Laid-Open Publication No. 2015-152973 discloses a method in which the motion of a real object and the motion of a hand with respect to the real object are detected when the hand is in contact with the real object, thereby receiving input operations with the real object regarded as a pointing device such as a mouse. Further, Japanese Patent Application Laid-Open Publication No. 2021-8794 discloses a method in which an operation switch is disabled when a real object is present inside a specified area, thereby preventing the opening or closing of a door.

However, in the technology disclosed in Japanese Patent Application Laid-Open Publication No. 2015-152973, input operations are necessarily enabled when a hand is in contact with a real object. Therefore, even if the motion of the hand does not intend to perform an input operation, the motion of the hand may still be regarded as the input operation. Further, in the technology disclosed in Japanese Patent Application Laid-Open Publication No. 2021-8794, an operation switch is necessarily enabled when no real object is present inside a specified area, potentially causing false operations of the operation switch. Accordingly, even if the technologies disclosed in Japanese Patent Application Laid-Open Publication No. 2015-152973 and Japanese Patent Application Laid-Open Publication No. 2021-8794 are applied to XR systems, false operations of controllers may occur.

SUMMARY OF THE INVENTION

The present invention provides a technology capable of preventing false operations of controllers with high accuracy.

The present invention in its first aspect provides an information processing device configured to receive an operation by a user on an operation interface, the information processing device including: one or more processors and/or circuitry configured to perform acquisition processing in which first information related to contact between a real object and a hand of the user is acquired, the real object being different from the operation interface and the information processing device; and perform control processing in which it is disabled a function associated with the operation interface in a case where the first information acquired in the acquisition processing indicates that the hand is in contact with the real object.

The present invention in its second aspect provides a control method of an information processing device that receives an operation by a user on an operation interface, the control method including: acquiring first information related to contact between a real object and a hand of the user, the real object being different from the operation interface and the information processing device; and disabling a function associated with the operation interface in a case where the acquired first information indicates that the hand is in contact with the real object.

The present invention in its third aspect provides a non-transitory computer readable medium that stores a program, wherein the program causes a computer to execute a computer to execute a control method of an information processing device that receives an operation by a user on an operation interface, the control method, the control method including: acquiring first information related to contact between a real object and a hand of the user, the real object being different from the operation interface and the information processing device; and disabling a function associated with the operation interface in a case where the acquired first information indicates that the hand is in contact with the real object.

Further features of the present invention will become apparent from the following description of embodiments with reference to the attached drawings.

DESCRIPTION OF THE EMBODIMENTS

Hereinafter, embodiments of the present invention will be described in detail on the basis of the accompanying drawings. Note that the following embodiments are provided as an example of means for implementing the present invention, and may be appropriately modified or changed depending on the configurations or various conditions of devices to which the present invention is applied. Further, it is also possible to appropriately combine the respective embodiments together.

First Embodiment

System Configuration

Figure 1:
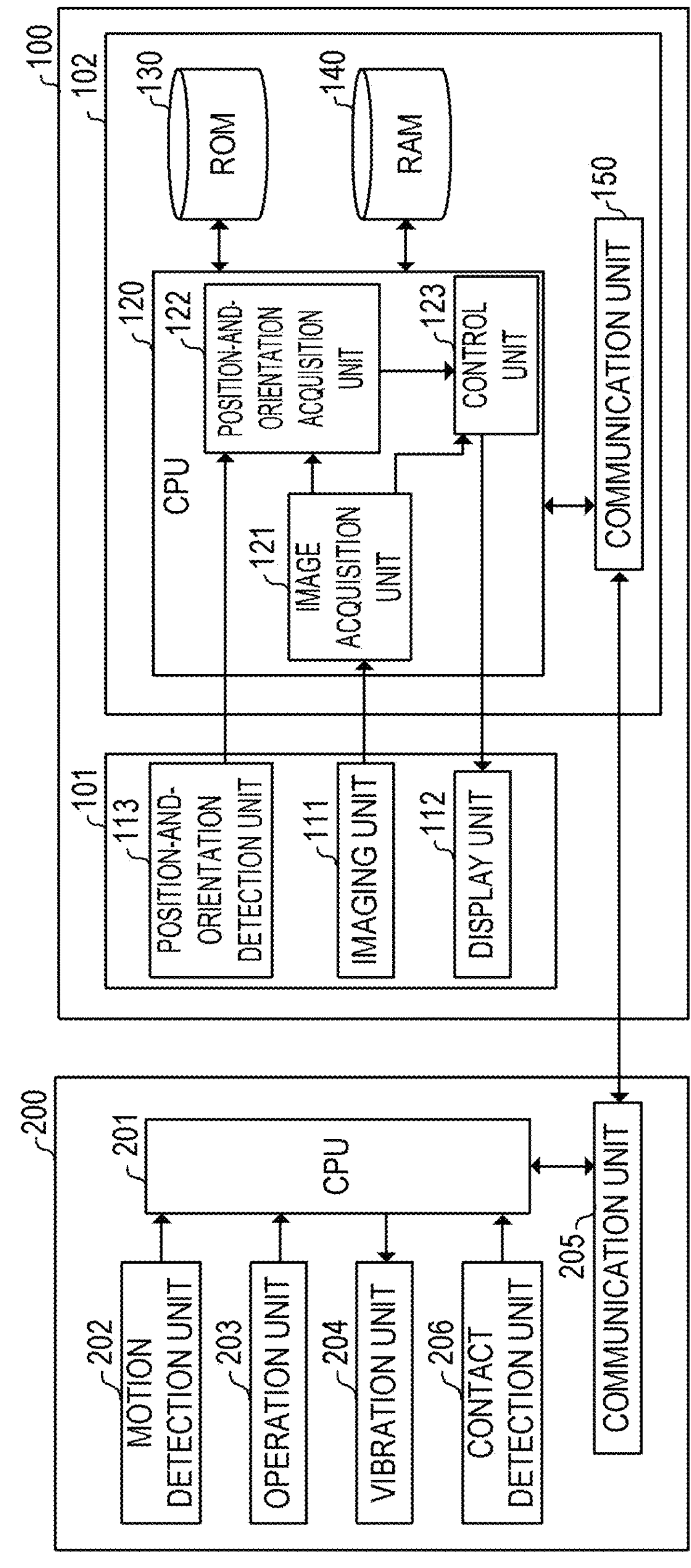
FIG. 1 is a block diagram illustrating the configuration of an information processing system according to a first embodiment.

FIG. 1 is a block diagram illustrating the configuration of an information processing system according to a first embodiment. The information processing system includes a Head-Mounted Display (HMD) 100, which is an example of an information processing device, and a controller 200.

Configuration of HMD 100

The HMD 100 includes a display device 101 and a control device 102.

Configuration of Display Device 101

The display device 101 includes an imaging unit 111, a display unit 112, and a position-and-orientation detection unit 113. The display device 101 constitutes, for example, the glasses-shaped display portion of the HMD 100. The display device 101 displays a composite image where an image of real space representing a user's field of vision (an image obtained by capturing the front range of the HMD 100) is combined with a computer graphic (CG), which is a virtual object in a form corresponding to a user's position and orientation. Thus, a user wearing the HMD 100 is capable of experiencing various virtual realities (mixed realities), such as those where CG are merged with real space. Note that the display device 101 may also have two display units, one for the right eye and the other for the left eye, to generate stereo images. In the following description, it is assumed that the display device 101 constitutes the display portion of the HMD 100. However, the display portion may include a tablet terminal or another display device. That is, any display device, which is transportable and capable of displaying an image corresponding to a user's field of vision, is available as the display device 101.

The imaging unit 111 is composed of an objective optical system that takes in external light (light of real space), an image sensor that converts light signals into electric signals, and the like. The imaging unit 111 captures an image representing a user's field of vision (an image of real space).

The display unit 112 displays an image generated by the control device 102.

The position-and-orientation detection unit 113 detects a user's position and orientation in real space. For example, a position-and-orientation sensor using an acceleration sensor and an angular speed sensor, a direction sensor using terrestrial magnetism, and an orientation sensor using a GPS are available as the position-and-orientation detection unit 113.

Configuration of Control Device 102

The control device 102 includes a CPU 120, a ROM 130, a RAM 140, and a communication unit 150. As the control device 102, a device having a high-performance computation processing function or a graphic display function is assumed to be used. The connection between the control device 102 and the display device 101 enables a user wearing the HMD 100 to view video of virtual space. The video of virtual space may also include video of a mixed-reality world where the real world and the virtual world are merged in real time and seamlessly.

An image acquisition unit 121, a position-and-orientation acquisition unit 122, and a control unit 123 are control blocks that operate inside the CPU 120.

The image acquisition unit 121 acquires an image of real space captured by the imaging unit 111 of the display device 101.

The position-and-orientation acquisition unit 122 acquires information indicating a user's position and orientation detected by the position-and-orientation detection unit 113 of the display device 101. The position-and-orientation acquisition unit 122 may also detect a marker arranged in real space from an image of the real space acquired by the image acquisition unit 121 to acquire the information indicating the position and orientation.

The control unit 123 generates a composite image by combining an image of real space acquired by the image acquisition unit 121 with CG, and transmits the generated composite image to the display unit 112 of the display device 101. Further, the control unit 123 acquires information output from the controller 200 via the communication unit 150, and controls the display device 101 on the basis of the acquired information.

The ROM 130 is a storage unit that stores information such as CG. Note that the control unit 123 is capable of switching CG read from the ROM 130 (that is, CG used to generate a composite image).

The RAM 140 is a work memory. In the RAM 140, constants for operating the control unit 123, variables, programs read from the ROM 130, or the like are stored.

The communication unit 150 is an interface for connecting with external devices. The communication unit 150 includes an interface for communicating with external devices through a so-called wireless LAN that complies with the IEEE802.11 standard. Further, the communication unit 150 includes an interface for communicating with external devices through so-called Bluetooth (Registered Trademark) that complies with the IEEE802.15.1 standard. Note that the communication system is not limited to a wireless LAN or Bluetooth (Registered Trademark). A wired or wireless communication system may be used as long as it is capable of performing communication, and any type of communication protocol may be used. The HMD 100 communicates with the controller 200 via the communication unit 150. Further, the communication unit 150 is capable of communicating with equipment other than the controller 200 such as smartphones.

The display device 101 and the control device 102 are connected to enable data communication with each other. Accordingly, the display device 101 and the control device 102 may be connected to each other in a wired or wireless fashion. Note that the display device 101 and the control device 102 may be separate devices or integrated into a single unit so as to be capable of being carried by a user. Further, some of the processing performed by the display device 101, the control device 102, and the controller 200 may be implemented by external equipment (such as smartphones, personal computers, workstations, video-game consoles, and server devices in the cloud).

Configuration of Controller 200

The controller 200 includes a CPU 201, a motion detection unit 202, an operation unit 203, a vibration unit 204, a communication unit 205, and a contact detection unit 206. The controller 200 is a device for operating the HMD 100. The CPU 201 controls the respective units of the controller 200.

The motion detection unit 202 has an Inertial Measurement Unit (IMU; an inertial sensor) capable of detecting inertial information (the spatial motion amount or angle) of the controller 200. Note that the motion detection unit 202 may also have any device as long as the device does not hinder the miniaturization of the controller 200 and is capable of detecting inertial information (information such as differences in position, speed, and acceleration).

The operation unit 203 may include any of a button, a touch pad, a touch panel, a directional cross-key, a joystick, a trackpad device, and the like. For example, a user is enabled to display a menu including a pointer on the display device 101 by pressing and holding the button. After that, the user is enabled to move the pointer to a desired item by pressing the directional cross-key in any direction. Then, the user is enabled to perform a determination action to determine the selection of the item by pressing the button. For example, the user is enabled to switch between displaying and hiding of a ray 300 illustrated in FIG. 3. User operation information to the operation unit 203 is transmitted to the HMD 100 via the communication unit 205.

The vibration unit 204 causes the controller 200 to vibrate. For example, when the ray 300 illustrated in FIG. 3 comes into contact with CG 301, the CPU 201 receives a vibration instruction from the HMD 100 via the communication unit 205. In response to the vibration instruction, the CPU 201 controls the vibration unit 204 to vibrate the controller 200. Through the vibration of the controller 200, the user is enabled to recognize that the ray 300 has come into contact with the CG 301.

The communication unit 205 is an interface for connecting with external devices. The controller 200 communicates with the HMD 100 via the communication unit 205. The communication unit 205 has the same configuration as that of, for example, the communication unit 150.

The contact detection unit 206 is a function unit for detecting whether the controller 200 has come into contact with a real object. The contact detection unit 206 detects whether the controller 200 has come into contact with a real object, using, for example, a pressure sensor or a contact sensor.

Method for Having HMD 100 worn and Controller 200 Attached

Figure 2:
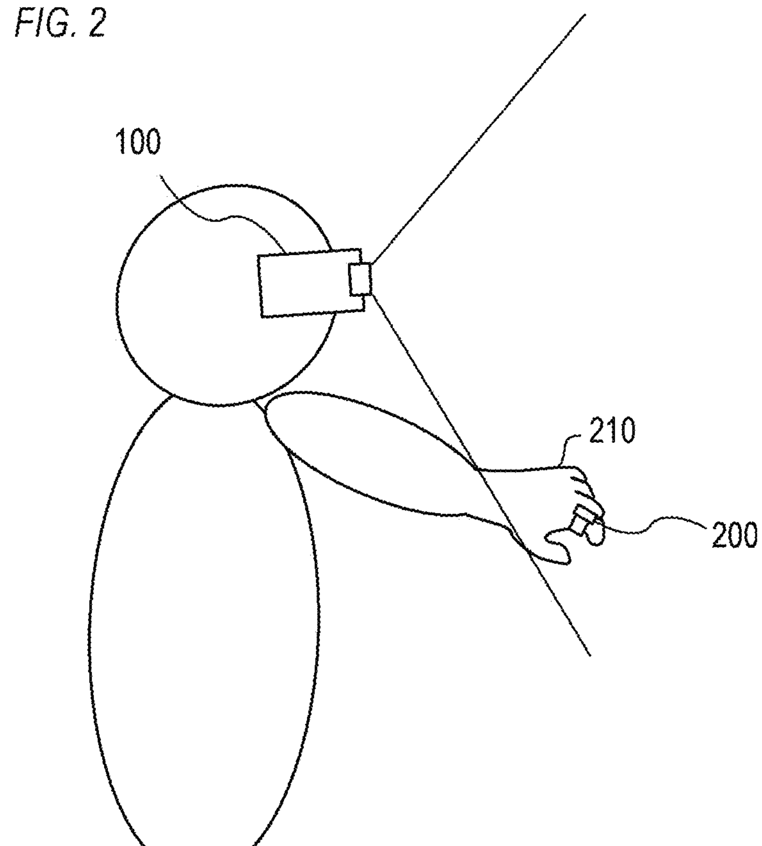
FIG. 2 is a schematic diagram illustrating a state where a user has an HMD worn and a controller attached.

FIG. 2 is a schematic diagram illustrating a state where a user has the HMD 100 worn and the controller 200 attached. As illustrated in FIG. 2, the user has the HMD 100 worn on the head and the ring-shaped controller 200 attached to a hand 210. The controller 200 is shaped like a ring, enabling the user to freely move a hand with the controller 200 attached to a finger. Note that the shape of the controller 200 is a ring, but it is not limited to this shape. For example, the controller 200 may also be shaped like a glove that is attachable to a hand. As described above, the controller 200 may be designed to be holdable by or attachable to a user's hand for user convenience. Further, in the first embodiment, an operation interface for operating the HMD 100 is the controller 200, but it is not limited to this. The operation interface may also be a user's hand or finger.

Display of Ray

Figure 3:
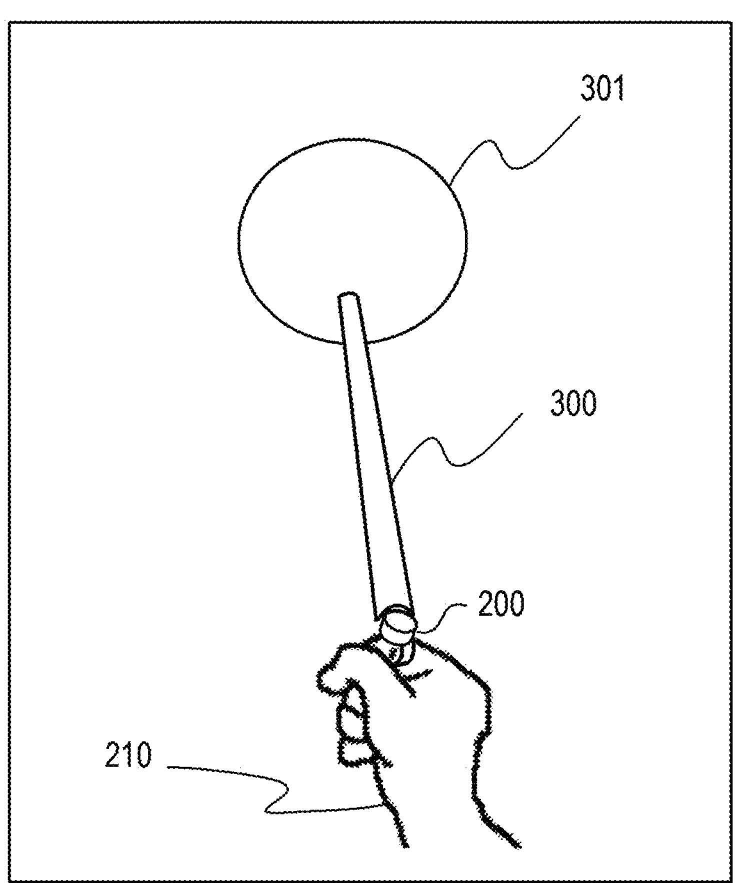
FIG. 3 is a schematic diagram illustrating a display example of a ray.

FIG. 3 is a schematic diagram illustrating a display example of a ray. The ray is a beam-shaped display item (graphic) indicating a position pointed to by a user. As illustrated in FIG. 3, a ray 300 is displayed toward CG 301 from the controller 200 attached to the hand 210 of a user. The tip-end position and angle of the ray 300 are determined on the basis of information related to the position and orientation of the controller 200 attached to the hand 210 of the user. The user is capable of operating items in virtual space such as the CG 301 using the ray 300. Note that the ray 300 is displayed on the basis of both the position and orientation of the controller 200 in the first embodiment. However, the ray 300 may also be displayed on the basis of one of the position and orientation of the controller 200.

Disabling Functions of Controller 200

Figure 4:
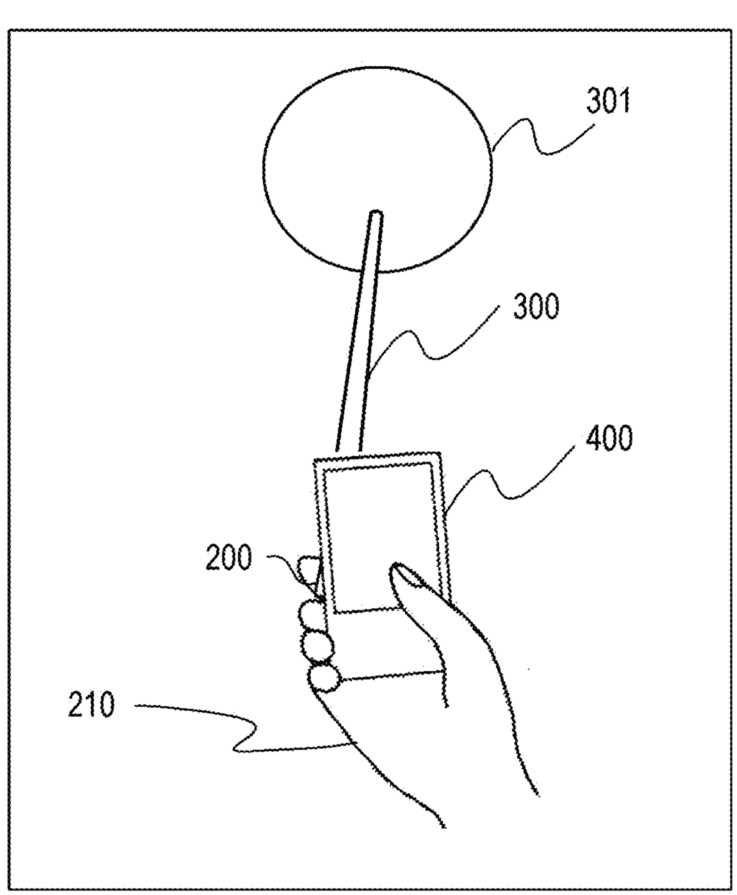
FIG. 4 is a schematic diagram illustrating a state where another real object is held by a hand with the controller attached.

FIG. 4 is a schematic diagram illustrating a state where another real object (here, a smartphone 400) is held by the hand 210 with the controller 200 attached. Like FIG. 3, the ray 300 is displayed toward the CG 301 from the controller 200. However, when the ray 300 is displayed while the smartphone 400 is held by the hand 210, a user may feel that the ray 300 is cumbersome. Further, when the user operates the smartphone 400 or when the user only wants to contact the smartphone 400, false operations of the controller 200 may occur. Therefore, in the first embodiment, the functions of the controller 200 are disabled when a hand with the controller 200 attached is in contact with a specified real object.

Figure 5:
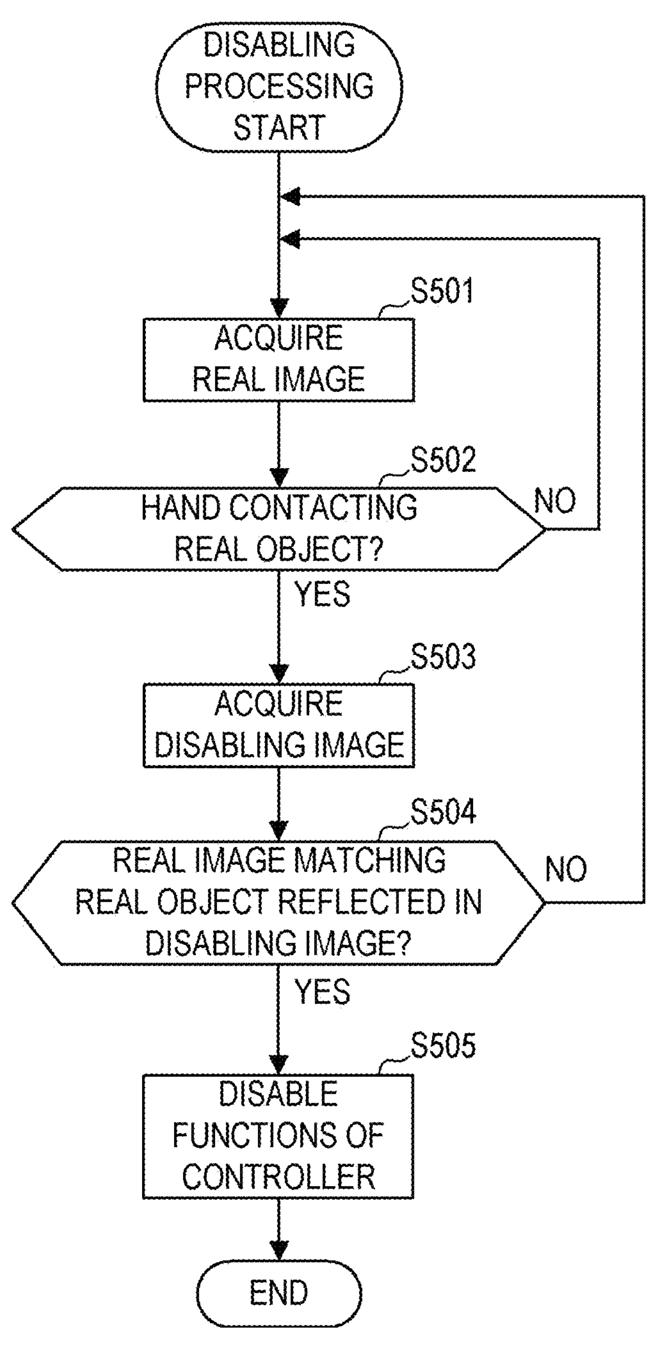
FIG. 5 is a flowchart illustrating disabling processing according to the first embodiment.

FIG. 5 is a flowchart illustrating disabling processing according to the first embodiment. In step S501, the control unit 123 acquires a real image (an image of real space) captured by the imaging unit 111 through the image acquisition unit 121.

In step S502, the control unit 123 determines whether a hand with the controller 200 attached is in contact with a real object on the basis of the acquired real image. The processing proceeds to step S503 when the hand with the controller 200 attached is in contact with the real object. Otherwise, the processing proceeds to step S501. For example, the control unit 123 may detect the region of the hand and the region of the real object from the real image, and determine whether the hand is in contact with the real object on the basis of the positional relationship between these regions. The control unit 123 may determine that the hand is in contact with the real object when the distance between the region of the hand and the region of the real object is less than a threshold, and determine that the hand is not in contact with the real object when the distance is at least the threshold. Further, the control unit 123 may determine that the hand is in contact with the real object when the region of the hand overlaps with the region of the real object, and determine that the hand is not in contact with the real object when the region of the hand does not overlap with the region of the real object. Note that in step S502, the region of the controller 200 is not determined as the region of the real object.

In the ROM 130, information related to a specified real object is stored. In step S503, the control unit 123 acquires information related to a specified real object from the ROM 130. In the first embodiment, the control unit 123 acquires, as the information related to the specified real object, a disabling image where the specified real object is reflected. The specified real object refers to a real object that disables the functions of the controller 200 when the hand with the controller 200 attached is in contact with the real object.

In step S504, the control unit 123 determines whether the real object reflected in the real image matches the real object reflected in the disabling image. The processing proceeds to step S505 when the real object reflected in the real image matches the real object reflected in the disabling image. Otherwise, the processing proceeds to step S501.

In step S505, the control unit 123 disables the functions of the controller 200 and ends the disabling processing. The disabled functions include, for example, the function of displaying a ray, the function of receiving operations on the controller 200, and the function of vibrating the controller 200.

In the first embodiment, the specified real object refers to a smartphone. The control unit 123 determines whether the real object in contact with the hand matches the smartphone on the basis of the real image captured by the imaging unit 111 and an image of the smartphone stored in the ROM 130. When the hand is in contact with the smartphone, the functions of the controller 200 are disabled. Thus, when the smartphone 400 is held by the hand 210 with the controller 200 attached as illustrated in FIG. 4, it is possible to prevent the user from feeling obstructed by that the ray 300 or making false operations with the controller 200 with high accuracy. Note that the specified real object is not limited to smartphones but may also include objects operated by the user such as tablets, keyboards, mice, car steering wheels, and drivers, as well as objects not operated by the user such as mugs. Further, the specified real object is not limited to one type but may also include a plurality of types of real objects.

Further, in the first embodiment, the functions of the controller 200 are not disabled when a real object in contact with a hand does not match a specified real object. However, the functions of the controller 200 may be disabled when the hand is in contact with a real object other than the controller 200.

Enabling Functions of Controller 200

When a hand with the controller 200 attached separates from a real object, the functions of the controller 200 are enabled (the disabled state of the functions of the controller 200 is cancelled). In addition, when the position of a hand with the controller 200 attached is outside the imaging range of the imaging unit 111, making it impossible to determine whether the hand is in contact with a real object, the functions of the controller 200 are also enabled.

Figure 6:
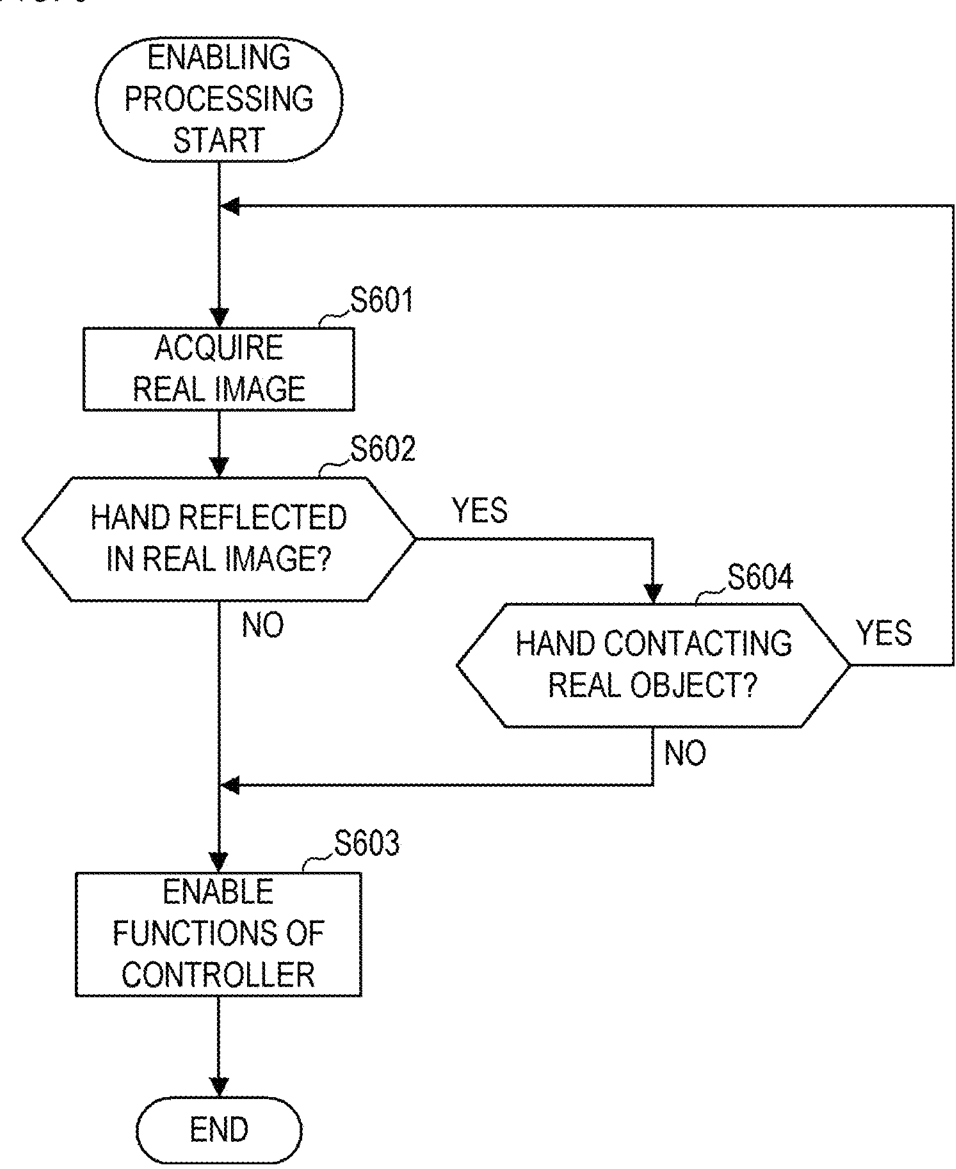
FIG. 6 is a flowchart illustrating enabling processing according to the first embodiment.

FIG. 6 is a flowchart illustrating enabling processing according to the first embodiment. In step S601, the control unit 123 acquires a real image captured by the imaging unit 111 through the image acquisition unit 121.

In step S602, the control unit 123 determines whether a hand with the controller 200 attached is reflected in the real image (whether the region of the hand is included in the real image). The processing proceeds to step S604 when the hand with the controller 200 attached is reflected in the real image. Otherwise, the processing proceeds to step S603.

In step S603, the control unit 123 enables the functions of the controller 200 that were disabled in step S505 of FIG. 5.

In step S604, the control unit 123 determines whether the hand with the controller 200 attached is in contact with a real object on the basis of the acquired real image. A method for determining whether the hand is in contact with the real object may be the same as the method performed in step S502. The processing proceeds to step S601 when the hand is in contact with the real object. When the hand is not in contact with the real object (the hand separates from the real object), the processing proceeds to step S603, enabling the functions of the controller 200.

As described above, when a hand with the controller 200 attached separates from a smartphone after coming into contact with the smartphone or when the hand is not reflected in a real image, the functions of the controller 200 that were once disabled are enabled. Thus, a user is enabled to resume various operations using the controller 200.

Disabling Some Functions of Controller 200

In step S505 of FIG. 5, the control unit 123 disables all the three functions, i.e., the function of displaying a ray, the function of receiving operations on the controller 200, and the function of vibrating the controller 200. However, any one of these functions may also be disabled, or two or three of these functions may also be disabled. Further, functions associated with the controller 200 that are different from these functions may also be disabled.

Second Embodiment

In the first embodiment, a determination is made as to whether a hand with the controller 200 attached is in contact with a real object on the basis of a real image captured by the imaging unit 111, thereby acquiring information (determination result) indicating whether the hand is in contact with the real object. Then, a determination is made as to whether to disable the functions of the controller 200 on the basis of the acquired determination result and information (disabling image) related to a specified real object stored in the ROM 130. In a second embodiment, a real object detects a user operation and outputs information (detection result) indicating whether a user is operating the real object. Then, an HMD 100 determines whether to disable the functions of a controller 200 on the basis of the information output from the real object. The HMD 100 regards a state where the user is operating the real object as a state where a hand is in contact with the real object, and regards a state where the user is not operating the real object as a state where the hand is not in contact with the real object. Thus, even if information related to a specified real object is not stored in a ROM 130, it is possible to suitably determine whether to disable the functions of the controller 200.

Figure 7:
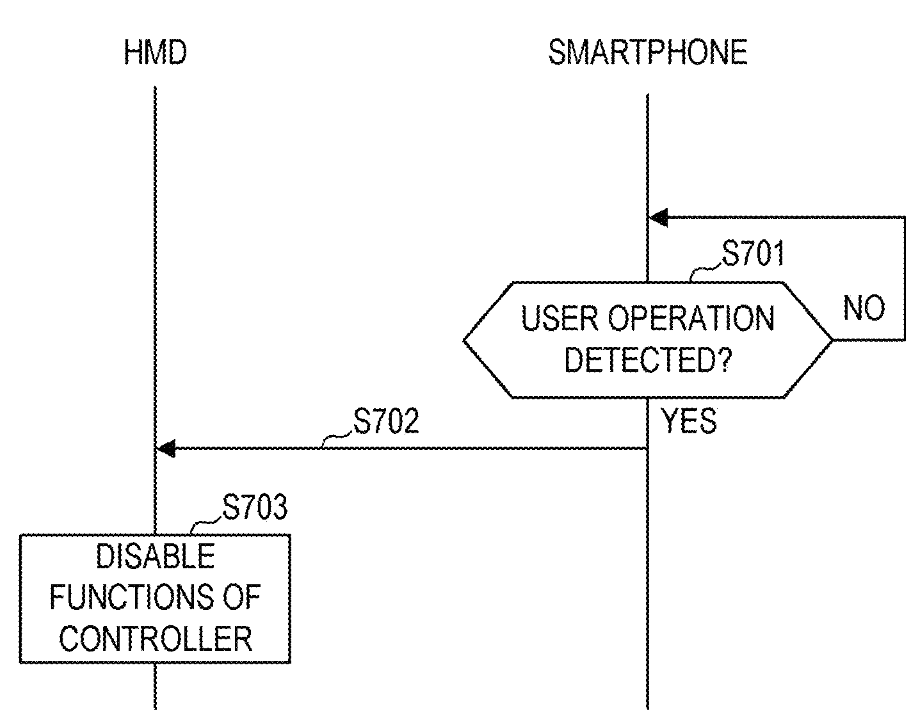
FIG. 7 is a sequence diagram illustrating disabling processing according to a second embodiment.

FIG. 7 is a sequence diagram illustrating disabling processing according to the second embodiment. In the second embodiment, a real object refers to an object operable by a user, such as a smartphone 400. The HMD 100 communicates with the smartphone 400 via a communication unit 150.

In step S701, the smartphone 400 detects a user operation on the smartphone 400 (determines whether a user operation has been performed). The smartphone 400 waits for the detection of the user operation. After the detection of the user operation, the processing proceeds to step S702.

In step S702, the smartphone 400 notifies (outputs) the HMD 100 of the detection of the user operation.

In step S703, a control unit 123 of the HMD 100 disables the functions of the controller 200 when receiving the notification (notification indicating that the smartphone 400 has detected the user operation) from the smartphone 400 via the communication unit 150.

Third Embodiment

In the second embodiment, a real object determines whether a user is operating the real object. In a third embodiment, an HMD 100 acquires information indicating whether a hand with a controller 200 attached is in contact with a real object and information related to the motion of the hand, and determines whether to disable the functions of the controller 200 on the basis of these acquired information. Thus, even if a real object does not have the function of determining whether a user is operating the real object, it is possible to suitably determine whether to disable the functions of the controller 200.

Figure 8:
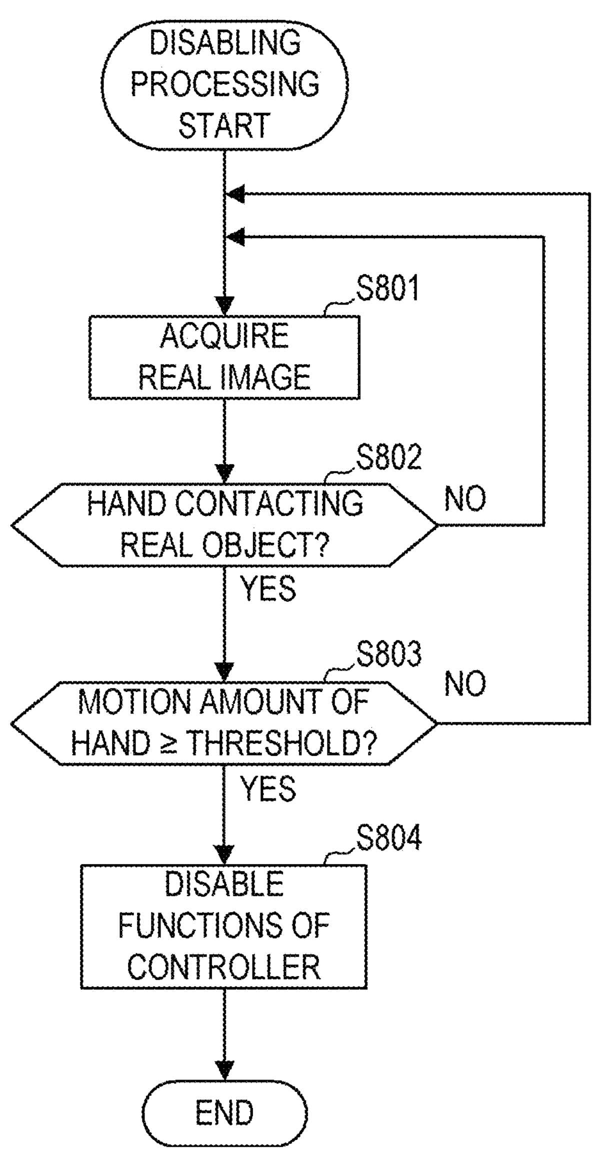
FIG. 8 is a flowchart illustrating disabling processing according to a third embodiment.

FIG. 8 is a flowchart illustrating disabling processing according to the third embodiment. In step S801, a control unit 123 acquires a real image captured by an imaging unit 111 through an image acquisition unit 121. In step S802, the control unit 123 determines whether a hand with the controller 200 attached is in contact with a real object on the basis of the acquired real image. The processing proceeds to step S803 when the hand with the controller 200 attached is in contact with the real object. Otherwise, the processing proceeds to S801.

In step S803, the control unit 123 determines whether the motion amount of the hand in contact with the real object is at least a specified threshold. The processing proceeds to S804 when the motion amount of the hand in contact with the real object is at least the specified threshold. Otherwise, the processing proceeds to step S801. The specified threshold may be, for example, a motion amount that enables determination of whether the real object is being operated (whether the hand is moving), such as a representative motion amount (a mean, a minimum value, or a middle value) observed when the real object is being operated.

In step S804, the control unit 123 disables the functions of the controller 200 and ends the disabling processing.

Fourth Embodiment

In a fourth embodiment, the functions of a controller 200 are enabled while a real object is in contact with CG in virtual space (three-dimensional space where the real world and the virtual world are merged). Thus, it is possible to prevent a decrease in convenience due to the disabling of the functions of the controller 200, such as a case where it becomes difficult to determine whether a real object is in contact with CG, for example, when the controller 200 stops vibrating.

Figure 9:
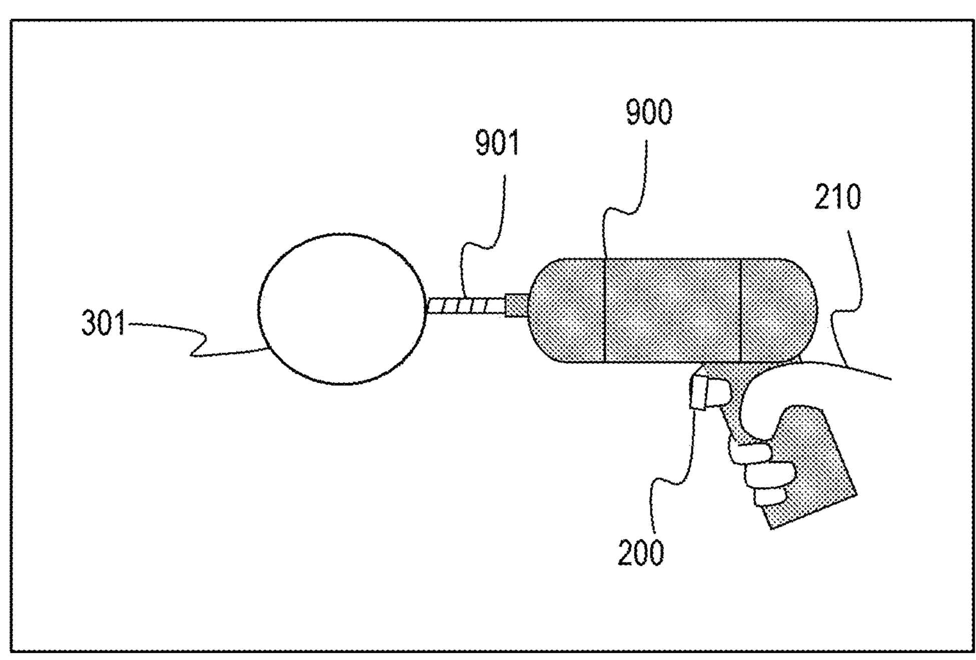
FIG. 9 is a schematic diagram illustrating a state where a real object is in contact with CG.

FIG. 9 is a schematic diagram illustrating a state where a real object is in contact with CG in virtual space. A user holds a driver 900 serving as a real object by a hand 210 with the controller 200 attached. A tip-end tool 901 of the driver 900 is in contact with CG 301.

In the first embodiment, when it is assumed that the driver 900 serves as a specified real object, the vibrating function of the controller 200 is disabled while the hand with the controller 200 attached is in contact with the driver 900. Further, in the third embodiment, when the hand with the controller 200 attached is in contact with the driver 900 and moving, the vibrating function of the controller 200 is disabled. Conversely, in the fourth embodiment, when the tip-end tool 901 (real object) of the driver 900 is in contact with the CG 301, it is possible to enable the vibrating function of the controller 200 regardless of whether the hand is in contact with the real object. As a result, a control unit 123 of an HMD 100 is enabled to transmit a vibrating instruction to the controller 200 to vibrate the same, and also enabled to notify the user of the contact between the tip-end tool 901 and the CG 301.

Figure 10:
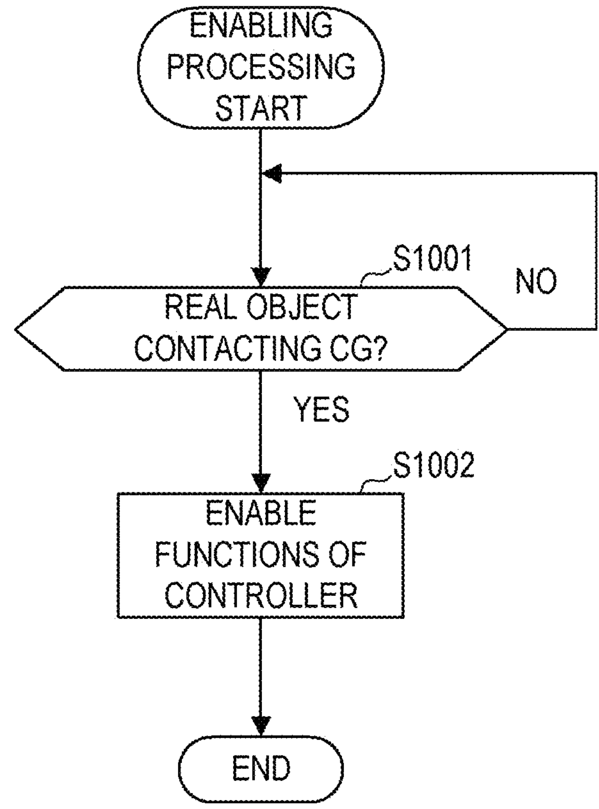
FIG. 10 is a flowchart illustrating enabling processing according to a fourth embodiment.

FIG. 10 is a flowchart illustrating enabling processing according to the fourth embodiment. In step S1001, the control unit 123 determines whether a real object is in contact with CG. The processing proceeds to step S1002 when the real object is in contact with the CG. Otherwise, the processing proceeds to step S1001. In step S1002, the control unit 123 enables the functions of the controller 200 and ends the enabling processing.

Note that an example was described where the tip-end tool 901 serves as a real object. However, the tip-end tool 901 may also be CG. In this case, the tip-end tool 901 (CG) may be overlaid onto the driver 900 (real object), and the controller 200 may be configured to vibrate when the tip-end tool 901 comes into contact with the CG 301. As described above, when CG overlaid onto a real object held by a user is in contact with different CG, the functions of the controller 200 may be enabled.

Fifth Embodiment

In a fifth embodiment, specified notification is performed when a hand with a controller 200 attached is in contact with a real object. Thus, a user is enabled to easily grasp a reason why the functions of the controller 200 are disabled.

Figure 11:
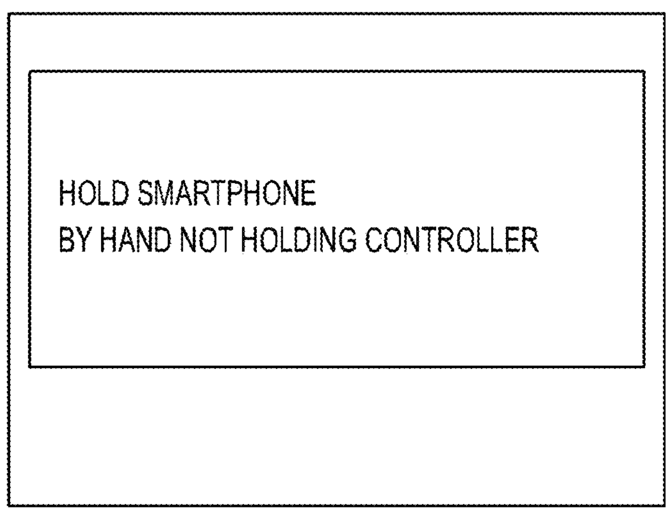
FIG. 11 is a schematic diagram illustrating an alert screen according to a fifth embodiment.

FIG. 11 is a schematic diagram illustrating an alert screen. The alert screen is a screen that, when a user holds another real object by a hand with the controller 200 attached, alerts (notifies) the user to hold the real object by a different hand. The control unit 123 displays the alert screen illustrated in FIG. 11 on a display unit 112 when determining in step S502 of FIG. 5 that the hand with the controller 200 attached is in contact with the real object. Note that notification may be performed not only by the display of the alert screen but also by, for example, the output of sound.

Note that notification is performed after the disabling of the controller 200 in the fifth embodiment, but the disabling may be omitted. Even with such a configuration, it is possible to prevent false operations of the controller 200. Further, it is possible to reduce processing loads with the omission of the disabling.

Sixth Embodiment

In the first embodiment, the HMD 100 determines whether a hand is in contact with a real object on the basis of a real image. In a sixth embodiment, a controller 200 regards a state where the controller 200 is in contact with a real object as a state where a hand is in contact with the real object, and regards a state where the controller 200 is not in contact with the real object as a state where the hand is not in contact with the real object. In this manner, the controller 200 determines whether a hand is in contact with a real object. Thus, for example, even when a real image is not acquired, it is possible to determine whether to disable the functions of the controller 200. Note that in the sixth embodiment, the real object refers to a real object other than the controller 200 (and a hand).

Figure 12:
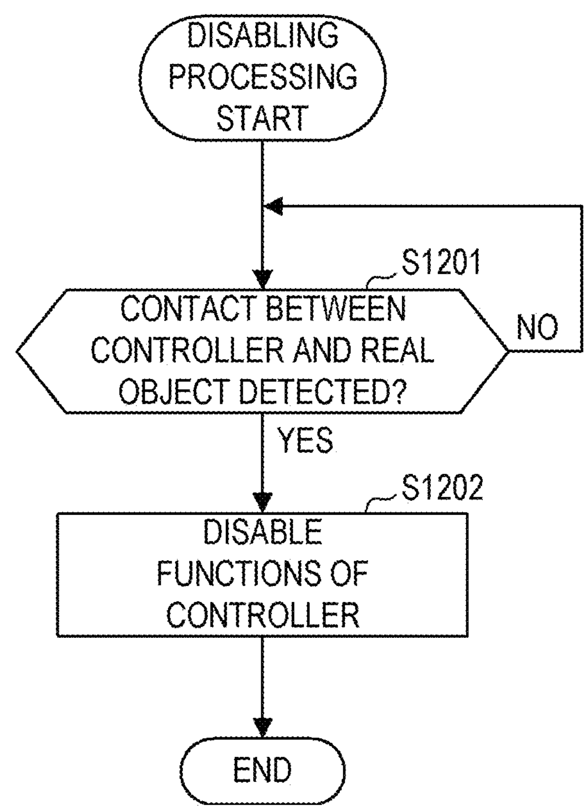
FIG. 12 is a flowchart illustrating disabling processing according to a sixth embodiment.

FIG. 12 is a flowchart illustrating disabling processing according to the sixth embodiment. In step S1201, a CPU 201 of the controller 200 detects the contact between the controller 200 and a real object (determines whether the controller 200 is in contact with the real object) by a contact detection unit 206. The CPU 201 waits for the detection of the contact between the controller 200 and the real object. The processing proceeds to step S1202 after the detection of the contact.

In step S1202, the CPU 201 disables the functions of the controller 200 and ends the disabling processing.

Note that the controller 200 may determine whether the controller 200 is in contact with a real object, and output information (determination result) indicating whether the controller 200 is in contact with the real object to the outside. Then, an HMD 100 may determine whether a hand is in contact with the real object on the basis of the information output from the controller 200, and switch between the enabling and disabling of the functions of the controller 200.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth.

Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

According to the present invention, it is possible to prevent false operations of controllers with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2023-174232, filed on Oct. 6, 2023, which is hereby incorporated by reference herein in its entirety.

What is claimed is:

1. An information processing device configured to receive an operation on a controller held by a hand of a user, the information processing device comprising:

one or more processors and/or circuitry configured to perform acquisition processing in which first information related to contact between a real object and the hand holding the controller is acquired, the real object being different from the controller and the information processing device, the real object being an object operable by the user, wherein the first information includes information related to whether the controller is in contact with the real object acquired from the controller, the first information configured to indicate that the hand is in contact with the real object in a case where the controller is in contact with the real object and indicates that the hand is not in contact with the real object in a case where the controller is not in contact with the real object; and perform control processing to implement: disabling a function associated with the controller in a case where the first information acquired in the acquisition processing indicates that the hand holding the controller is in contact with the real object, or enabling the function in a case where the hand holding the controller is not in contact with the real object, wherein during the control processing it is determined whether the real object in contact with the hand matches a specified real object stored in a storage to confirm the implementation of the disabling of the function associated with the controller and when the real object in contact with the hand does not match the specified real object the disabling of the function is not implemented and the enabling of the function is implemented.

2. The information processing device according to claim 1, wherein in the control processing, the function is enabled in a case where the hand separates from the real object after coming into contact with the real object.

3. The information processing device according to claim 1, wherein in the acquisition processing, as the first information, information related to whether the user is operating the real object is acquired from the real object, and the first information is configured to indicate that the hand is in contact with the real object in a case where the user is operating the real object and indicates that the hand is not in contact with the real object in a case where the user is not operating the real object.

4. The information processing device according to claim 1, wherein in the acquisition processing, the first information is acquired on a basis of an image representing a field of vision of the user, and in the control processing, the function is not disabled in a case where a region of the hand is not included in the image.

5. The information processing device according to claim 1, wherein in the acquisition processing, third information related to motion of the hand is further acquired, and in the control processing, based on the first information and the third information, the function is not disabled in a case where the hand in contact with the real object is not moving.

6. The information processing device according to claim 1, wherein, in a case where the real object is in contact with a virtual object in three-dimensional space where a real world and a virtual world are merged, in the control processing, the function is enabled regardless of whether the hand is in contact with the real object.

7. The information processing device according to claim 1, wherein the function associated with the controller includes at least one of a function of displaying a graphic based on a position or an orientation of the controller, a function of receiving an operation on the controller, and a function of vibrating the controller.

8. The information processing device according to claim 1, wherein in the control processing, furthermore, a notification is performed to hold the real object by a hand different from the hand holding the controller in a case where the hand is in contact with the real object.

9. The information processing device according to claim 1, wherein the information processing device is accommodated in a display device or the controller.

10. The information processing device according to claim 1, wherein the controller includes a contact sensor, and in the control processing, the function associated with the controller is disabled on a basis of the first information output from the controller.

11. The information processing device according to claim 1, wherein the controller is a ring-shaped controller to be attached to a finger of the user.

12. The information processing device according to claim 1, wherein while the real object is in contact with a virtual object, the first information indicates that the hand is in contact with the real object, and the function of the controller is enabled even if the real object in contact with the hand matches the specified real object.

13. The information processing device according to claim 1, wherein while a first virtual object superimposed on the real object is in contact with a virtual object different from the first virtual object, the first information indicates that the hand is in contact with the real object, and the function of the controller is enabled even if the real object in contact with the hand matches the specified real object.

14. A control method of an information processing device that receives an operation on a controller held by a hand of a user, the control method comprising:

acquiring first information related to contact between a real object and the hand holding the controller, the real object being different from the controller and the information processing device, the real object being an object operable by the user, wherein the first information includes information related to whether the controller is in contact with the real object acquired from the controller, the first information configured to indicate that the hand is in contact with the real object in a case where the controller is in contact with the real object and indicates that the hand is not in contact with the real object in a case where the controller is not in contact with the real object; and disabling a function associated with the controller in a case where the acquired first information indicates that the hand holding the controller is in contact with the real object or enabling the function in a case where the hand holding the controller is not in contact with the real object, wherein it is determined whether the real object in contact with the hand matches a specified real object stored in a storage to confirm the implementation of the disabling of the function associated with the controller and when the real object in contact with the hand does not match the specified real object the disabling of the function is not implemented and the enabling of the function is implemented.

15. A non-transitory computer readable medium that stores a program, wherein the program causes a computer to execute a control method of an information processing device that receives an operation on a controller held by a hand of a user, the control method comprising:

acquiring first information related to contact between a real object and the hand holding the controller, the real object being different from the controller and the information processing device, the real object being an object operable by the user, wherein the first information includes information related to whether the controller is in contact with the real object acquired from the controller, the first information configured to indicate that the hand is in contact with the real object in a case where the controller is in contact with the real object and indicates that the hand is not in contact with the real object in a case where the controller is not in contact with the real object; and disabling a function associated with the controller in a case where the acquired first information indicates that the hand holding the controller is in contact with the real object or enabling the function in a case where the hand holding the controller is not in contact with the real object, wherein it is determined whether the real object in contact with the hand matches a specified real object stored in a storage to confirm the implementation of the disabling of the function associated with the controller and when the real object in contact with the hand does not match the specified real object the disabling of the function is not implemented and the enabling of the function is implemented.

* * * * *